Patented Feb. 11, 1941

2,231,017

UNITED STATES PATENT OFFICE 2,231,017

ALLO-PREGNANE COMPOUNDS AND METHOD OF OBTAINING THE SAME

Russell Earl Marker, State College, Pa., assignor to Parke, Davis & Company, Detroit, Mich., a corporation of Michigan No Drawing. Application March 12, 1937, Serial No. 130,582

6 Claims. (Cl. 260—397)

The invention relates to a new keto-alcohol of the sterol series, and particularly to epi-allo-pregnanol-(3)-one-(20) and its isolation from mixtures with other sterol derivatives of a non-ketonic nature.

It is known that the two non-ketonic alcohols having a cyclopentano-10,13-dimethyl polyhydrophenanthrene nucleus, pregnanediol and allo-pregnanediol, belonging to the pregnane or progesterone chemical group, may be isolated from the neutral or alcoholic fraction of human pregnancy urine. However, no compounds of a ketonic nature have been heretofore isolated from these or other like mixtures.

It is an object of the invention to separate and isolate the new ketonic alcohol, epi-allo-pregnanol-(3)-one-(20), from its mixtures with pregnanediol and allo-pregnanediol or other like non-ketonic alcohols or sterols.

A further object of the invention is the utilization of epi-allo-pregnanol-(3)-one-(20) for the preparation of a new diol compound, epi-allo-pregnanediol, and its derivatives, and for preparation by a new method of the known compound, allo-pregnanedione.

It has now been found that the above and other objects of the invention may be realized by way of the following steps:

1. Treating a mixture comprising epi-allo-pregnane-ol-(3)-one-(20) and non-phenolic non-ketonic neutral alcohols having a cyclopentano-10,13-dimethyl polyhydrophenanthrene nucleus with an acylating agent derived from a dibasic organic acid to convert the alcohols, both ketonic and non-ketonic, into their corresponding acid mono-esters.

2. Reacting the acid mono-esters with basic or alkaline reagents to convert them into their water-soluble ester-salts.

3. Separating the soluble ester-salts in aqueous solution from water-insoluble impurities, such as hydrocarbons soluble in water-immiscible organic solvents.

4. Converting the separated and thus purified ester-salts back into their acid mono-esters by treatment with acid.

5. Saponifying the mono-esters to produce a purified mixture of epi-allo-pregnane-ol-(3)-one-(20) and non-ketonic alcohols.

6. Treating the purified mixture from step (5) with a ketone reagent capable of reacting with the epi-allo-pregnane-ol-(3)-one-(20) but not with the non-ketonic alcohols.

7. Separating the reaction product of step (6) from non-ketonic alcohols, and,

8. Decomposing the reaction product to obtain epi-allo-pregnan-ol-(3)-one-(20), which can be readily separated by means of organic solvents from the decomposition products of this step.

The above series of eight steps is of special value when the original mixture to be treated is a neutral carbinol fraction from human pregnancy urine. In step (6) above the use of a hydrazine compound capable of forming a water-soluble hydrazine derivative with the epi-allo-pregnanol-(3)-one-(20) is preferred as a ketone reagent.

When starting with human pregnancy urine, the phenolic estrogenic hormones, including those known as theelin and theelol (estrin and estriol), may be separated by the method of Doisy et al., J. Biol. Chem. 87, 357 (1930), to leave a carbinol residue or fraction. In this case, the carbinol residue contains the straight carbinols, such as pregnanediol and allo-pregnanediol, along with ketonic carbinols like the new epi-allo-pregnanol-(3)-one-(20) of this invention and any hydrocarbons which may be present. The carbinol fraction is first purified and separated from any hydrocarbons and like impurities present. This may be done by converting the carbinols into their acid phthalates, the alkali metal salts of which are water-soluble whereas the hydrocarbons are insoluble. The separated phthalates are hydrolyzed to regenerate the original carbinols and the ketonic carbinols separated by means of their water-soluble betaine hydrazine compounds from the water-insoluble non-ketonic carbinols. The water-soluble reaction product of betaine hydrazine chloride with the ketonic carbinols is easily hydrolyzed to regenerate the ketonic carbinols which, in the case where human pregnancy urine was the starting material, may consist practically entirely of epi-allo-pregnanol-(3)-one-(20). If necessary, the epi-allo-pregnanol-(3)-one-(20) thus obtained may be purified by way of its semicarbazone, from which the free ketonic alcohol can be regenerated in pure form.

The epi-allo-pregnanol-(3)-one-(20) can be converted to its acylated derivatives by reaction with acylating agents, e. g. acetic anhydride or like acylating agent.

Allo-pregnanedione can be obtained from the new epi-allo-pregnanolone by oxidation, e. g. using chromic oxide in acetic acid.

The new 3-epi-allo-pregnanediol-20 is obtainable from the epi-allo-pregnanol-(3)-one-(20) by catalytic reduction. The resulting diol compound may be converted to its acylated derivatives in similar manner to that stated above for the acyl derivatives of epi-allo-pregnanol-(3)-one-(20).

The following examples will serve to illustrate the invention:

*Separation of carbinols from hydrocarbons and other impurities.*—The residue left from 10,000 gallons of human pregnancy urine after the separation of theelin and theelol by the Doisy method is hydrolyzed by refluxing with an excess of alkali. This is then steam distilled until no more volatile oils come over. The residue is cooled, filtered, the solid precipitate washed well with water, dried, and finally shaken with ice-cold ether. The ether-insoluble portion consists of a mixture of pregnanediol and allo-pregnanediol.

The ether-soluble portion is concentrated leaving 777 g. of tarry residue. This is dissolved in benzol and the carbinols present converted into their acid phthalates according to the following procedure: To 50 g. of the tar are added 25 g. of phthalic anhydride and 25 cc. of dry pyridine. The solution is heated on a steam bath for 2 hours, ether added, and the pyridine removed by washing with dilute sulfuric acid. The ether solution is shaken with a solution of 50 g. of sodium carbonate in 200 cc. of water. The ether layer contains the non-carbinol fraction. The carbonate solution which is extracted thoroughly with ether, is acidified with sulfuric acid and then extracted with ether. The ether is evaporated and the phthalates saponified by refluxing for 2 hours with 200 cc. of alcohol containing 50 g. of potassium hydroxide in 40 cc. of water. Water is added and the alcohol distilled. The alkaline solution with its suspended solids is extracted with ether giving 31.4 g. of carbinols.

*Separation of epi-allo-pregnanol-3-one-20 from carbinol fraction.*—To 31.4 g. of total carbinols are added 30 cc. of ethyl alcohol and 5 g. of betaine hydrazine chloride. The reaction mixture is boiled for 15 minutes on a steam bath, then poured into 200 cc. of water containing ice. The solution is thoroughly extracted with ether. The ether layer contains the non-ketonic carbinols, whereas the aqueous layer contains the ketonic carbinols. An excess of hydrochloric acid is added to the aqueous layer and the product warmed on a steam bath. The oil which separates is extracted with ether. This gives 2.0 g. of ketonic carbinols. The total urine residue gives 31 g. of ketonic carbinols.

*Semicarbazone of epi-allo-pregnanol-3-one-20.*—31 g. of the ketonic carbinol fraction are sublimed in 3 g. quantities in high vacuum, collecting the portion from 140–200° which weighs 23 grams. To a solution of 8 g. of the sublimate in 100 cc. of alcohol are added 13.6 g. of sodium acetate and 11.1 g. of semicarbazide hydrochloride. The alcohol is distilled to dryness and the semicarbazone residue washed with hot water and finally with ether. The white solid (7.3 g.) is crystallized from alcohol to a constant melting point of 248–250° dec.

Anal. calcd. for $C_{22}H_{37}N_3O_2$: C, 70.3; H, 9.9. Found: C, 69.9; H, 9.9.

*Epi-allo-pregnanol-3-one-20.*—To a solution of 3 g. of semicarbazone in 150 cc. of alcohol are added 15 cc. of sulfuric acid in 30 cc. of water. The product is refluxed for one-half hour, poured into water and thoroughly extracted with ether. The ether is distilled and the residue sublimed in high vacuum at 130°. The sublimate is crystallized from 70 percent alcohol and then from 70 percent acetone, m. 162–164°. It does not absorb bromine in the cold, and does not precipitate with digitonin.

$$(\alpha)_D^{30} = +91.0° c = 1 \text{ percent}$$

in alcohol.

Anal. calcd. for $C_{21}H_{34}O_2$: C, 79.2; H, 10.8. Found: C, 79.3; H, 10.8.

*Oxidation of epi-allo-pregnanol-3-one-20 to allo-pregnanedione.*—To a solution of 180 mg. of epi-allo-pregnanol-3-one-20 in 15 cc. of glacial acetic acid are added 58 mg. of chromic oxide in 30 cc. of 90 percent acetic acid. It is allowed to stand at 15–20° for 16 hours. Water is added and the precipitate filtered off and dried. This is sublimed in high vacuum at 115°. The sublimate is then crystallized from acetone. The crystals melt at 198–200°. Mixed with allo-pregnanedione, m. 200°, it gives no depression in melting-point.

Anal. calcd. for $C_{21}H_{32}O_2$: C, 79.7; H, 10.2. Found: C, 79.5; H, 10.1.

*Acetate of epi-allo-pregnanol-3-one-20.*—To 1 g. of epi-allo-pregnanol-3-one-20 are added 5 cc. of acetic anhydride. The product is refluxed for 30 minutes and the excess acetic anhydride distilled under reduced pressure. The residue is sublimed at 130° with a mercury vapor pump. It is crystallized from 70 percent alcohol and then from 70 percent acetone, m. 139–140°.

$$(\alpha)_D^{30} = +112° c = 1g. \text{ per 100 cc.}$$

in alcohol.

Anal. calcd. for $C_{23}H_{36}O_3$: C, 76.8; H, 10.1. Found: C, 77.0; H, 10.0.

*3-epi-allo-pregnanediol-20.*—To a solution of 100 mg. of epi-allo-pregnanol-3-one-20 in 100 cc. of acetic acid are added 100 mg. of platinic oxide. This is shaken for 2 hours with hydrogen at 45 pounds pressure. The catalyst is filtered off and the acetic acid distilled under reduced pressure. The residue is crystallized from acetone, m. 205–207°. Mixed with allo-pregnanediol m. 242° it gives a depression in melting-point to 194°.

Anal. calcd. for $C_{21}H_{36}O_2$: C, 78.8; H, 11.3. Found: C, 78.8; H, 11.2.

*Diacetate of 3-epi-allo-pregnanediol-20.*—A solution of 100 mg. of 3-epi-allo-pregnanediol-20 in 5 cc. of acetic anhydride is refluxed for one hour. The acetic anhydride is evaporated under reduced pressure and the residue recrystallized from 60 percent acetone, m. 124°.

Anal calcd. for $C_{25}H_{40}O_4$: C, 74.4; H, 10.0. Found: C, 74.5; H, 10.2.

The formula for epi - allo - pregnanol -(3)- one-(20) and its oxidation and reduction may be illustrated as follows:

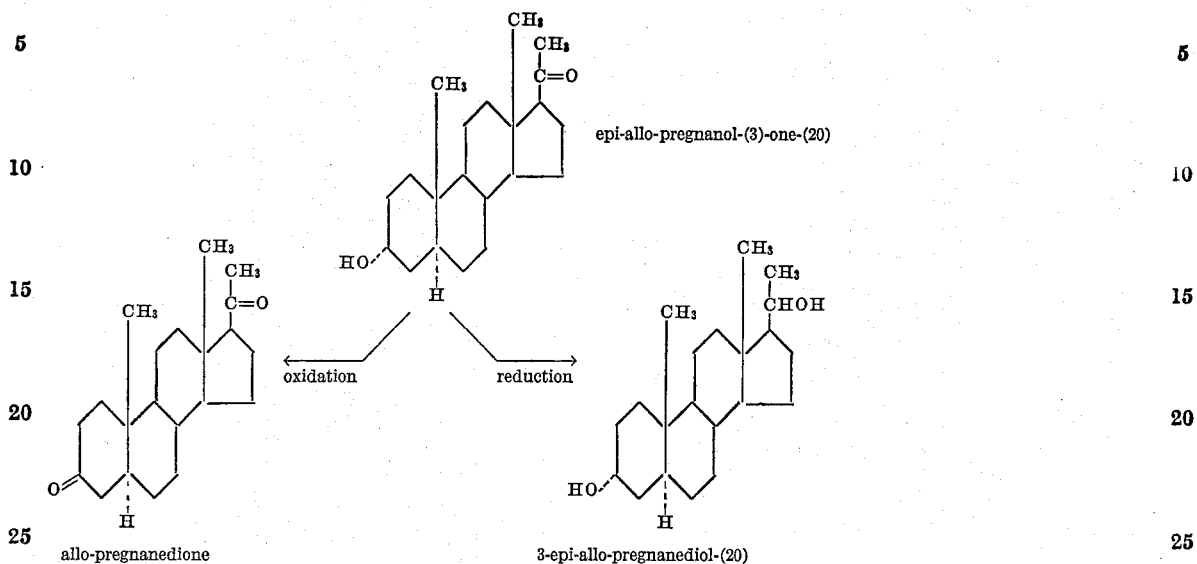

Epi-allo-pregnanol-3-one-20 and epi-allo-pregnanediol-3,20 together with their acyl derivatives are of value not merely as intermediates for the synthesis of other compounds but also because they possess male sex hormone activity; for example, in its effect on the growth of the rat seminal vesicles epi-allo-pregnanol-3-one-20 is found to be of the same order of potency as androsterone.

Although the examples given describe one mode of practising the invention, it will be understood that many variations therefrom are possible in materials, conditions, proportions, etc., without departing from the spirit of the invention as defined in the claims.

Some of the subject matter disclosed but not claimed herein is claimed in my divisional application, Serial No. 214,841, filed June 20, 1938, and also my application, Serial No. 151,834, filed July 3, 1937.

What I claim as my invention is:

1. The process for preparing epi-allo-pregnanol-(3)-one-(20) from mixtures of epi-allo-pregnanol-(3)-one-(20) with non-ketonic alcohols having a cyclopentano-10,13-dimethyl polyhydrophenanthrene nucleus, the steps which comprise reacting the mixture with an acylating agent derived from a dibasic organic acid to form a mixture of the corresponding acid mono-esters of the alcohols, converting the acid mono-esters into their water-soluble ester salts, dissolving out the ester salts with aqueous liquid from their solution in water-immiscible solvent to eliminate hydrocarbons and other water-insoluble impurities, converting the purified ester salts back into their mono-esters by treatment with acid, saponifying the mono-esters to a purified mixture of epi-allo-pregnanol-(3)-one-(20) with non-ketonic alcohols, separating the epi-allo-pregnanol-(3)-one-(20) from the ketonic alcohols by reacting the purified mixture with a ketone reagent, separating the reaction product with the ketone reagent from the non-ketonic alcohols, and decomposing the separated reaction product with production of epi-allo-pregnanol-(3)-one-(20).

2. In a process for the preparation of epi-allo-pregnanol-(3)-one-(20) from the carbinol residues after extraction of phenolic compounds from human pregnancy urine, the steps which comprise converting the alcohols in the mixture to a mixture of the corresponding water-soluble acid mono-ester salts of a dibasic organic acid in water-immiscible solvent, dissolving out the mixture of salts by means of aqueous liquid from the water-insoluble impurities, and converting the purified mono-ester salt mixture back into the corresponding mixture of mono-esters by treatment with acid and saponifying the mono-esters to a purified mixture of epi-allo-pregnanol-(3)-one-(20) with non-ketonic alcohols.

3. Lower aliphatic carboxylic acid esters of epi-allo-pregnanol-(3)-one-(20).

4. Epi-allo-pregnanol-(3)-one-(20) having a melting point of about 164° C.

5. Epi-allo-pregnanol-(3)-one-(20) acetate having a melting point of about 140° C.

6. Compounds having the following formula,

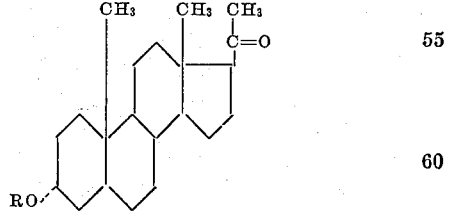

where RO is a member of the group consisting of hydroxyl and a lower aliphatic carboxylic acid ester radical, the compound in which RO is hydroxyl not being precipitated by digitonin.

RUSSELL EARL MARKER.